US009213704B2

(12) United States Patent
Murphy et al.

(10) Patent No.: US 9,213,704 B2
(45) Date of Patent: Dec. 15, 2015

(54) DICTIONARY SERVICE

(75) Inventors: Shawn Murphy, Seattle, WA (US);
Advay V. Mengle, Bellevue, WA (US);
Jeffrey T. Pearce, Seattle, WA (US);
Aimee Ayn Freeding, London (GB);
Andrew John Nuttall, Surrey (GB);
Michal Mark Vine, Hampshire (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 12/943,943

(22) Filed: Nov. 11, 2010

(65) Prior Publication Data

US 2012/0072404 A1   Mar. 22, 2012

Related U.S. Application Data

(60) Provisional application No. 61/384,689, filed on Sep. 20, 2010.

(51) Int. Cl.
*G06F 17/30* (2006.01)
(52) U.S. Cl.
CPC ................ *G06F 17/30038* (2013.01)
(58) Field of Classification Search
USPC .................................. 707/706, 750
See application file for complete search history.

(56) References Cited

U.S. PATENT DOCUMENTS

| | | | |
|---|---|---|---|
| 5,742,834 A * | 4/1998 | Kobayashi | 704/10 |
| 7,370,034 B2 * | 5/2008 | Franciosa et al. | 707/750 |
| 7,657,423 B1 * | 2/2010 | Harik et al. | 704/9 |
| 2005/0283725 A1 * | 12/2005 | Griffin et al. | 715/532 |
| 2008/0082318 A1 * | 4/2008 | Kataoka et al. | 704/9 |
| 2009/0271372 A1 * | 10/2009 | Fife et al. | 707/999.003 |
| 2009/0313295 A1 * | 12/2009 | Blaxland et al. | 707/103 R |
| 2010/0070921 A1 * | 3/2010 | Rieman et al. | 715/811 |
| 2010/0319002 A1 * | 12/2010 | Gosain et al. | 719/311 |
| 2012/0072404 A1 * | 3/2012 | Murphy et al. | 707/706 |

FOREIGN PATENT DOCUMENTS

| | | |
|---|---|---|
| CN | 101501610 A | 8/2009 |
| CN | 101650605 A | 2/2010 |

OTHER PUBLICATIONS

First Office Action, dated Feb. 22, 2013, issued by the State Intellectual Property Office of the People's Republic of China in connection with corresponding Chinese Application No. 201110291179.7.

* cited by examiner

*Primary Examiner* — James Trujillo
*Assistant Examiner* — Giuseppi Giuliani
(74) *Attorney, Agent, or Firm* — Judy Yee; Aaron Chatterjee; Micky Minhas

(57) ABSTRACT

A user of an online service sends a request to write a review of a media content item, using a text limited device such as a gamepad of a videogame console. In response to the request, one or more dictionaries are requested using metadata associated with the request such as the title of the movie or a genre associated with the movie. The dictionaries are received and used to populate user interface elements with words and phrases. Each user interface element corresponds to a sentence component such as a verb, noun, etc. The user may use the gamepad to cycle through the words and phrases in each user interface element to generate a sentence.

17 Claims, 6 Drawing Sheets

| 201 | 203 | 205 |
|---|---|---|
| △<br>was impressed by<br>loved | △<br>the lead actor | △<br>all the way through<br>most of the time<br>during the first scene |
| I was inspired by | the FX | until the final scene |
| fell in love with<br>hated<br>laughed at<br>▽ | the campy dialog<br>the ending<br>the big kiss<br>▽ | whenever he spoke<br>▽ |

FIG. 2

DICTIONARY SERVICE

CROSS-REFERENCE TO RELATED APPLICATIONS

This application claims the benefit of U.S. Provisional Patent Application No. 61/384,689, filed on Sep. 20, 2010. This provisional patent application is hereby expressly incorporated by reference herein in its entirety.

BACKGROUND

User generated text content is an increasingly popular feature on many websites and other online services. For example, users may generate and submit reviews for one or more products available at an online merchant, or may generate and submit a comment in response to an article at an online newspaper. The user generated content is often of a very high quality and has become an essential part of many websites and other online services.

However, as more and more users access the Internet using devices other than a computer, generating text content of the same high quality can be difficult because of inherent limitations of the devices. These devices may include smart phones and videogame consoles, and while these devices often have sophisticated browsers that allow users to easily select and view Internet content, they are often poorly suited for generating original text content. For example, many smart phones have keyboards that are adequate for typing short text for email, but may make generating a longer high quality review difficult. Videogame consoles often lack a keyboard completely, forcing the user to select characters one at a time using a joystick or gamepad. Accordingly, users of such text limited devices may generate reviews of a lower quality or reduce the overall number of reviews that they generate, leading to a reduced online experience for themselves, and possibly other users who rely on such user generated content.

SUMMARY

A user of an online service sends a request to write a review of a media content item, such as a movie for example. The user may be writing the review using a text limited device such as a gamepad of a videogame console. In response to the request, one or more dictionaries are requested using metadata associated with the request, such as the title of the movie or a genre associated with the movie. The one or more dictionaries are received and used to populate user interface elements with words and phrases from the dictionaries. Each user interface element corresponds to a sentence component such as a verb, noun, adjective, or prepositional phrase. The user may use the gamepad to cycle through the words and phrases in each user interface element to generate text, such as a complete sentence or other textual phrase, for example. The dictionaries may be specific to the media content item being reviewed so that the user can select words and phrases describing characters, plot elements, or even the names of actors associated with the media content item to construct the review. In this way, the user may generate a review for the media content item without having to type the review themselves. In addition, the words and phrases from the dictionaries may be randomized and/or adjusted so that the same words and phrases do not appear too frequently in multiple reviews of the media content item.

In an implementation, a request to receive one or more dictionaries is received from a client device at a dictionary server. The request includes metadata. One or more dictionaries are retrieved in response to the request according to the included metadata. A dictionary includes a plurality of words and phrases, and some or all of the words and phrases have an associated frequency. The one or more dictionaries are provided to the client device. The client device selects a subset of the words and phrases from the one or more dictionaries according to the associated frequencies. In some implementations, one of the words may be fixed or always part of a selected subset.

In an implementation, user interface elements are displayed to the user by the client device. Each of the user interface elements corresponds to a component of a sentence and each of the user interface elements includes words and phrases from the one or more dictionaries according to the associated frequencies. A plurality of selections to words and phrases in one or more of the user interface elements is received. Text is generated using the selected words and phrases.

Implementations may include some or all of the following features. The request to generate text may include one of a request to write a review of media content, a request to send a message, and a request to initiate a chat session. The metadata may include a score for the review, and a title associated with the media content. The media content may include videogame content, audio content, and music content. The metadata may include a title, and the one or more dictionaries may include names of characters associated with the title. The metadata may include a title of a movie, and the one or more dictionaries may include names of characters associated with the movie.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 2 is an illustration of an example user interface elements;

DETAILED DESCRIPTION

Figure 1:
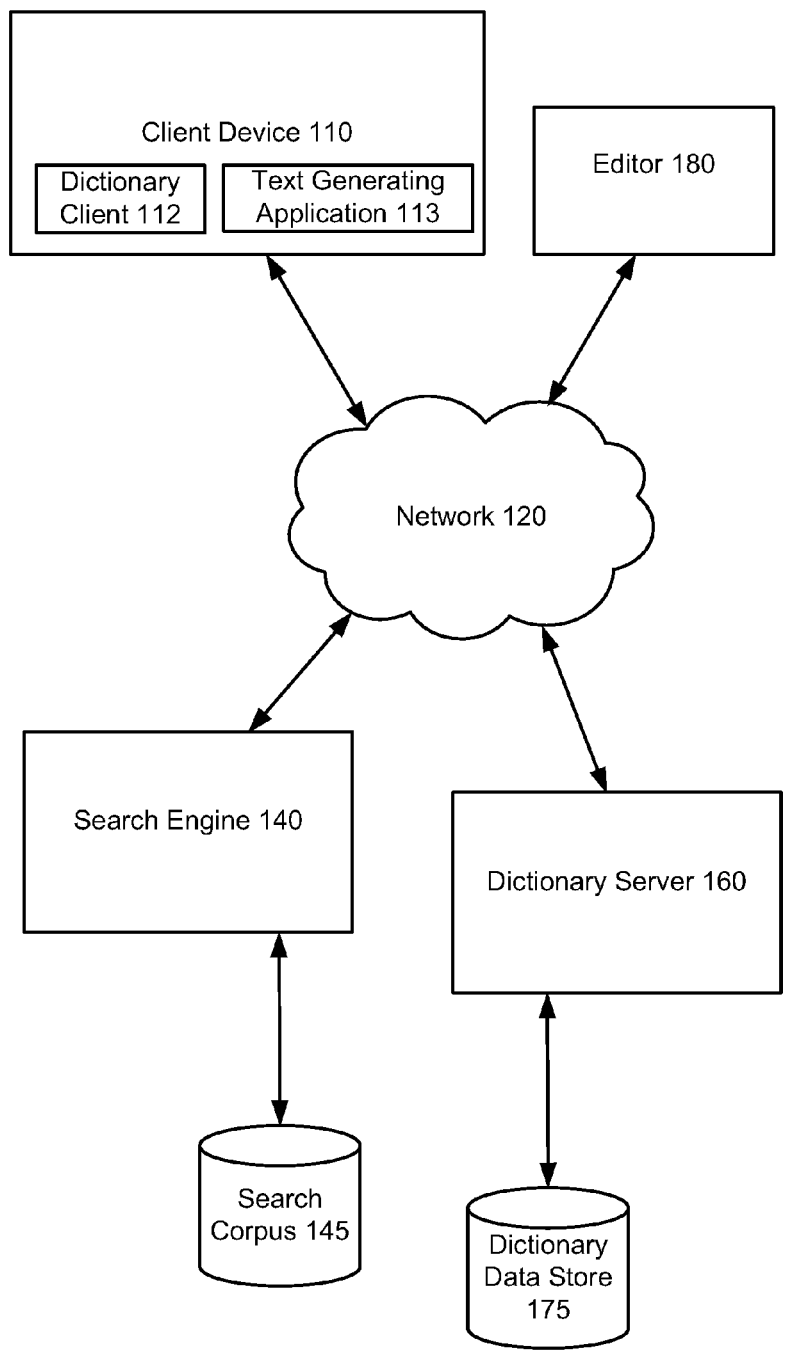
FIG. 1 is an illustration of an example environment for creating and providing one or more dictionaries.

FIG. 1 is an illustration of an example environment 100 for creating and providing one or more dictionaries. A client device 110 may communicate with a dictionary server 160 over a network 120. The client device 110 may be configured to communicate with the dictionary server 160 to access, receive, or retrieve one or more dictionaries. The network 120 may be a variety of network types including the public switched telephone network (PSTN), a cellular telephone network, and a packet switched network (e.g., the Internet). The dictionary server 160 may be implemented using one or more computing devices such as the computing system 600 illustrated with respect to FIG. 6. In addition, the dictionary server 160 may be implemented using one or more cloud based computing systems.

The client device 110 may execute one or more text generating applications 113. A text generating application 113 may include a variety of software applications that allow users to generate text content including, but not limited to, web browsers, word processors, small messaging service applications, chat applications, and videogame applications, for example.

The client device 110 may be what is referred to herein as a "text limited" device. A text limited device may include any computing device where text entry may be difficult, tedious, or otherwise difficult when compared to conventional desktop or laptop computers. Text limited devices may include videogame consoles, as well as cell phones and/or smart phones. For example, videogame consoles often omit keyboards entirely, forcing the user to generate text by selecting characters from an onscreen keyboard using a gamepad. Smart phones, while typically having physical or touch screen keyboards, are often uncomfortable for users to generate long text entries. However, the client device 110 is not limited to text limited devices and may be implemented using a variety of computing systems including the computing system 600.

To facilitate text entry on text limited devices, the client device 110 may further include a dictionary client 112. The dictionary client 112 may facilitate text entry by displaying one or more user interface elements on the client device 110. Each user interface element may correspond to what is referred to herein as a "sentence component." A sentence component may correspond to parts of a sentence including but not limited to nouns, verbs, adjectives, adverbs, objects, subjects, predicate phrases, prepositional phrases, and combinations thereof. Each user interface element may display multiple words and phrases from a dictionary corresponding to the sentence component. A user may then construct a sentence of text using the sentence components by selecting a word or phrase from each of the user interface elements. Alternatively or additionally, the user may construct multiple sentences, paragraphs, or phrases. For example, the user may cycle through the various words and phrases in each user interface element using a gamepad, or using one or more gestures on a smart phone touch screen.

In an implementation, the user interface elements may be "wheels" that the user may use to cycle between the words and phrases. For example, the user may press up or down on a particular button or pad of the gamepad to cycle through the words and phrases that are available for selection and use in the text that will be provided as part of the review or other user provided content. Similarly, a user may use one or more gestures supported by a touch user interface of a smart phone to turn the wheels and cycle through the available words and phrases. The generated text may be provided to the text generating application 113. In some implementations, the dictionary client 112 may expose one or more methods or functions to the text generating application 113 using an application programming interface. The text generation application 113 may then invoke one or more of the methods or functions when a user initiates text entry through the text generation application 113.

For example, FIG. 2 is an illustration of example user interface elements 201, 203, and 205 displayed to a user by the dictionary client 112. Each user interface element corresponds to a sentence component, and a user may construct a complete sentence, phrase, or paragraph by selecting a word or phrase from each of the user interface elements. As illustrated, a user has constructed the sentence "I was inspired by the FX until the final scene" by selecting the phrase "I was inspired by" from the user interface element 201, selecting the phrase "the FX" from the user interface element 203, and selecting the phrase "until the final scene" from the user interface element 205.

In some implementations, the user interface elements and the sentence component associated with each user interface element are fixed when the user interface elements are displayed to the user. For example, the user may select words and phrases from each user interface element but may not change the order of the user interface elements. In other implementations, the user may move the user interface elements around, and therefore change the order in which the sentence components associated with each user interface element may appear in the constructed sentence. In addition, in some implementations, the word or phrase and/or the sentence component associated with each user interface element may dynamically change, based on the words and phrases selected by the user, the words and phrases selected by other users and/or the order that the user interface elements are selected by the user. In an implementation, after a user selects a word from the user interface element 201, the words or phrases displayed in the user interface element 203 (and possibly 205) are dynamically changed to reflect the selected word. By dynamically changing the words and phrases and/or the sentence components associated with each user interface element, the dictionary client 112 may ensure that the user creates a grammatically correct sentence, phrase, or paragraph.

In some implementations, the dictionary client 112 may populate the words and phrases in each user interface element from one or more dictionaries. The one or more dictionaries may be provided to the dictionary client 112 from the dictionary server 160. The dictionary server 160 may store multiple dictionaries in a dictionary data store 175.

The dictionary client 112 may send a request for one or more dictionaries to the dictionary server 160. The request may include metadata that is associated with the request. The metadata may include an identifier of the text generating application 113. For example, if the text generating application 113 is a chat application, the metadata may identify that the one or more dictionaries will be used by the dictionary client 112 to generate text for a chat application.

In some implementations, the text generating application 113 may be used to generate a review or comment for a restaurant or other service provider. In other implementations, the text generating application may generate a review or a comment for a media content item. The media content item may be a film, a video, a song or album, or a videogame, for example. In these implementations, the metadata may further identify one or more characteristics of the media content item or service under review. For example, where the media content item is a film or videogame, the metadata may include characteristics such as the title of the media content item or a genre associated with the media content item. In addition, the metadata may include a proposed review score or rating for the media content item. For example, before writing the review, the user may use the text generating application 113 to indicate how many stars will be associated with the review or may indicate whether the review will be a positive review or a negative review (e.g., thumbs up or thumbs down). For a review of a restaurant, the metadata may include the name of the restaurant and/or the type of food that is served by the restaurant. In addition, in some implementations, the metadata may indicate where the user is located, such as country or region, or may indicate the language used by the user.

In some implementations, the dictionaries stored in the dictionary storage 175 may also have associated metadata. The metadata may describe intended usages for each dictionary and/or text generating application 113 that each dictionary is suitable for. For example, metadata for a dictionary may include words and phrases that are suitable for a chat application. The metadata may indicate that the dictionary includes words and phrases that are suitable for reviewing films, videogames, restaurants, or music. The metadata may indicate that the dictionary includes words and phrases that are suitable for reviewing a particular genre of films, such as science fiction, or a type of food such as Italian. The metadata may also indicate that the dictionary includes words or phrases that may be used by persons in a particular country, region, or language. In an implementation, the metadata may indicate that the dictionary is suitable for reviewing a particular film by title, such as "Avatar", for example.

The dictionary server 160 may determine one or more dictionaries to retrieve from the dictionary data store 175 in response to a request by matching the metadata included with the received request with the metadata associated with the dictionaries. In some implementations, the dictionary server 160 may determine the one or more dictionaries from the dictionary data store 175 that have the greatest amount of matching metadata with the metadata associated with the request. In other implementations, the mechanism in which the dictionary for a given request's metadata is chosen, and the metadata itself can be configured by a user or administrator or an editor 180. For example, if the request has metadata that indicates that the request is for a film review, in the genre science fiction, for the film "Avatar", and there are dictionaries associated with metadata that indicates that they are for film reviews, dictionaries associated with metadata that indicates that they are for film reviews in the sci-fi genre, and dictionaries that are associated with metadata that indicates they are for film reviews in the sci-fi genre for the film "Avatar", then the dictionary server 160 may retrieve one or more of the latter dictionaries as they are the most specific dictionaries available for the request. However, if no dictionaries were associated with the title "Avatar", the dictionary server 160 may retrieve one of more of the dictionaries associated with metadata that indicates they are for film reviews in the sci-fi genre.

In some implementations, the dictionaries in the dictionary data store 175 may be created by one or more editors 180. An editor 180 may be an editor associated with one or more media content items (e.g., a creator, producer, or owner of the media content items). For example, an owner of the film "Avatar" may provide a dictionary for the film that includes nouns related to plot elements of the film, character names, and individuals associated with the film (e.g., actors, directors, producers, etc.). An editor 180 may also be associated with the dictionary server 160. For example, one or more editors may be employed by an organization associated with the dictionary server 160 to create or maintain dictionaries specific to one or more media content item categories or genres.

In some implementations the editors 180 may include one or more interested parties or volunteers. For example, a fan of a particular restaurant may generate a dictionary that is suitable to review the restaurant. The dictionary may include words corresponding to dishes on the menu. To prevent explicit, offensive, or inaccurate dictionaries, a user-submitted dictionary may be screened or reviewed by an additional editor 180 to ensure that the dictionary is of sufficient quality to include in the dictionary data store 175.

The dictionary server 160 may use one or more external sources to supplement one or more retrieved dictionaries. In some implementations, the external sources may be a search engine 140. The dictionary server 160 may query the search engine 140 using some or all of the metadata associated with the request. The search engine 140 may match the query with data stored in a search corpus 145, and may return a set of matching results. The dictionary server 160 may process the set of matching results to identify one or more relevant words of phrases, and may add the identified words and phrases to the one or more retrieved dictionaries. Any one of a variety of external data sources may be used.

For example, the request for one or more dictionaries may include metadata indicating that the request is to review the album "Revolver" by "The Beatles" in the genre "Rock". The dictionary server 160 may retrieve one or more dictionaries for reviewing music in the genre "Rock". The dictionary server 160 may also query the search engine 140 using one or more search terms such as "The Beatles" and "Revolver". The dictionary server 160 may receive a set of results from the search engine 140 and process the results to determine that "The Beatles" include the members John Lennon, Paul McCartney, Ringo Starr, and George Harrison. The names of the members may then be added to the one or more dictionaries before they are provided to the dictionary client 112.

Figure 3:
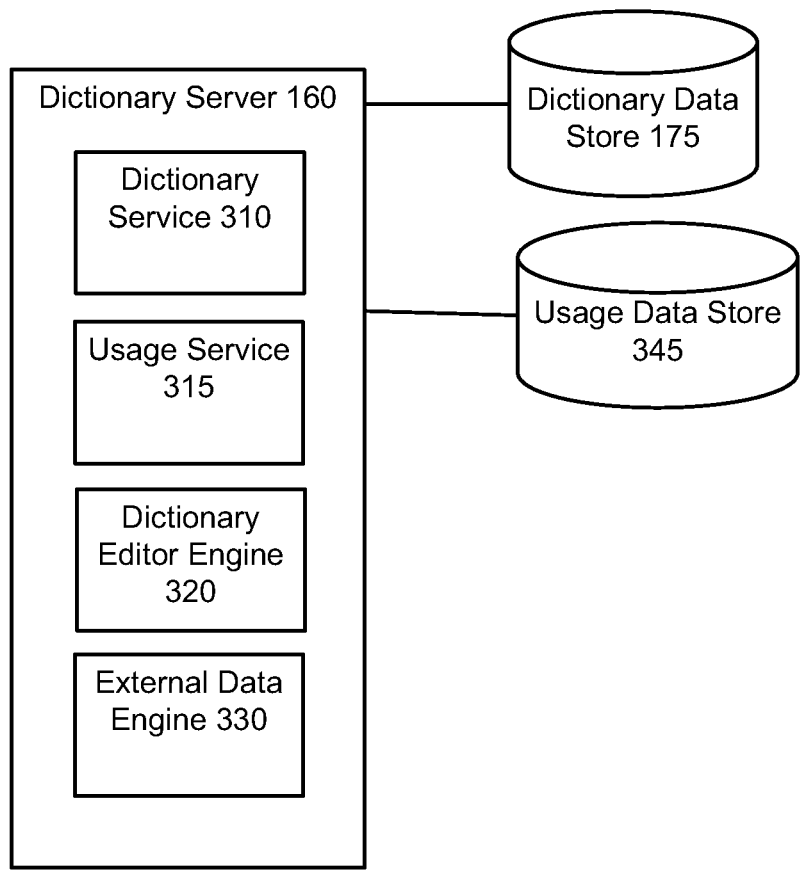
FIG. 3 is an illustration of an example dictionary server.

FIG. 3 is an illustration of an example dictionary server 160. The dictionary server 160 may include several components including, but not limited to, a dictionary service 310, a usage service 315, a dictionary editor engine 320, and an external data engine 330. In addition, the dictionary server 160 may assess stored data from one or more of the dictionary data store 175 and/or a usage data store 345. While the dictionary service 310, the usage service 315, and the dictionary editor engine 320 are shown as each being part of the dictionary server 160, it is for illustrative purposes only; each may be implemented separately or together using one or more computing devices such as the computing system 600 illustrated with respect to FIG. 6.

The dictionary service 310 may receive requests for one or more dictionaries from one or more dictionary client 112. The requests may include metadata. The dictionary service 310 may determine one or more dictionaries from the dictionary data store 175 that has metadata that matches some or all of the metadata included with the request. Where no dictionaries have metadata that matches all of the metadata included with a request, the dictionary service 310 may determine one or more dictionaries with the greatest amount of matching metadata. Each dictionary may include one or more words and phrases.

In some implementations, the dictionary service 310 may select a subset of the words and phrases in the determined one or more dictionaries and may provide the selected subset to a dictionary client 112 for display in a user interface element. Alternatively or additionally, the entire contents of the one or more dictionaries may be supplied to the dictionary client 112, and the dictionary client 112 may select the one or more words and phrases that are displayed.

The usage service 315 may manage usage data for one or more of the dictionaries in the dictionary data store 175. The usage data may be stored in the usage data store 345. The usage data store 345 may include frequencies for one or more of the words and phrases in the dictionaries and may control the frequency with which a word or phrase from a dictionary appears in a user interface element when the dictionary is provided to a dictionary client 112. The usage data may further specify that a word or phrase is always displayed in a user interface element, or may specify an order with which the words or phrases are displayed in the user interface elements.

For example, a frequency of 1 for a word in a dictionary may dictate that the word appear in a user interface element every time that the dictionary is provided to a dictionary client 112. A frequency of 0.1 for a word may dictate that the word appear in a user interface element only 10 percent of the times that the dictionary is provided to the dictionary client 112. In implementations where the dictionary client 112 receives an entire dictionary, the dictionary client 112 may select the words and phrases from the dictionary based on the frequencies associated with the words and phrases. In implementations where the dictionary client 112 receives only a subset of the words and phrases from the dictionary server 160, the dictionary service 310 may select the subset according to the associated frequencies.

As described above, the usage data may further specify the order with which the words or phrases are displayed in the user interface element. For example, each user interface element may be initially displayed with one or more words and phrases that are visible and/or a word or phrase that is preselected for the user. Other words or phrases may become visible as the user cycles through the available words and phrases. As may be appreciated, the words and phrases that are initially visible and/or preselected are more likely to be selected by the user. Thus, an editor 180 or user may indicate in the usage data which words or phrases may be preselected or initially visible in a user interface element. Alternatively or additionally, the placement of the words or phrases may be weighted according to their associated frequency. Thus, the word or phrase with the highest frequency may be preselected in a user interface element.

The usage service 315 may maintain and adjust frequencies in the usage data store 345 based on user selections. When a user generates text by selecting one or more words and phrases of a dictionary, the dictionary client 112 may send an indication of a selection of the one or more words and phrases to the usage service 315. The usage service 315 may then adjust the frequencies of each of the one or more words and phrases based on the indicated usage. For example, the usage service 315 may reduce or increase each of the frequencies. By reducing the frequencies of the words and phrases based on usage, the sentences generated by the users may avoid becoming too similar or redundant since each user may receive a different subset of a dictionary. In addition, to further avoid similar text, the default or initially selected word or phrase in each user interface element may be randomized. In some implementations, the frequency associated with some of the words and phrases may be fixed such that the frequencies are not reduced regardless of user selections. In addition, in some implementations, one or more dictionaries may have a minimum or threshold frequency. Words or phrases that fall below the minimum frequency may be removed from the one or more dictionaries.

The dictionary editor engine 320 may provide tools, such as an application programming interface, that allow one or more editors 180 to create or edit the dictionaries in the dictionary data store 175. An editor 180 may use the tools to create a dictionary and add one or more phrases to a created or existing dictionary. The editor 180 may further specify the metadata that is associated a created dictionary, and may set the one or more frequencies for each of the one or more words or phrases. In some implementations, the dictionary editor engine 320 may allow an editor 180 to select an existing dictionary and add one or more words and phrases to create a new dictionary. The dictionary editor engine 320 may further allow a user to edit or adjust the frequencies of words and phrases of an existing dictionary, and specify how the usage service 315 adjusts frequencies of the words and phrases in a dictionary in response to user selections.

The external data engine 330 may supplement the words and phrases in one of more of the dictionaries using data retrieved from one or more external data sources. The external data sources may include the search engine 140, one or more public databases such as WIKIPEDIA or IMDB, and/or one or more private databases such as LEXIS NEXIS. Other external databases may be used such as external databases associated with a content provider such as SkyTV, Comcast, Time Warner, etc.

In some implementations, the external data engine 330 may query one or more external databases using the metadata associated with a dictionary or a request for a dictionary. For example, if the metadata associated with a dictionary or a request specifies the film "Big", then the external data engine 330 may query one or more external data sources for the film "Big".

The external data engine 330 may receive a set of results from the external data sources. Where the set of results include links to other sources, such as URLs, the external data engine 330 may retrieve the documents referenced by the links. For example, the search engine 140 may return a set of URLs to the external data engine 330, and the external data engine 330 may retrieve the webpages referenced by one or more of the URLs.

The external data engine 330 may process the set of results to determine one or more additional words and phrases that may be added to the dictionary. For example, if a particular word or phrase appears in the set of results more than a threshold amount of times, the external data engine 330 may determine that the word or phrase may be added to the dictionary. Other methods such as pattern matching or classifiers may be used to determine the words or phrases that are added to the dictionary.

Continuing the example above, the external data engine 330 may determine that the words and phrases "Tom Hanks", "Penny Marshall", and "Zoltar" appear in most of the documents in the set of results from the query "Big". The external data engine 330 may then add the determined words and phrases to the dictionary or dictionary subset that is provided to the dictionary client 112. Alternatively or additionally, the external data engine 330 may add the words and phrases to one or more dictionaries stored in the dictionary data store 175.

Figure 4:
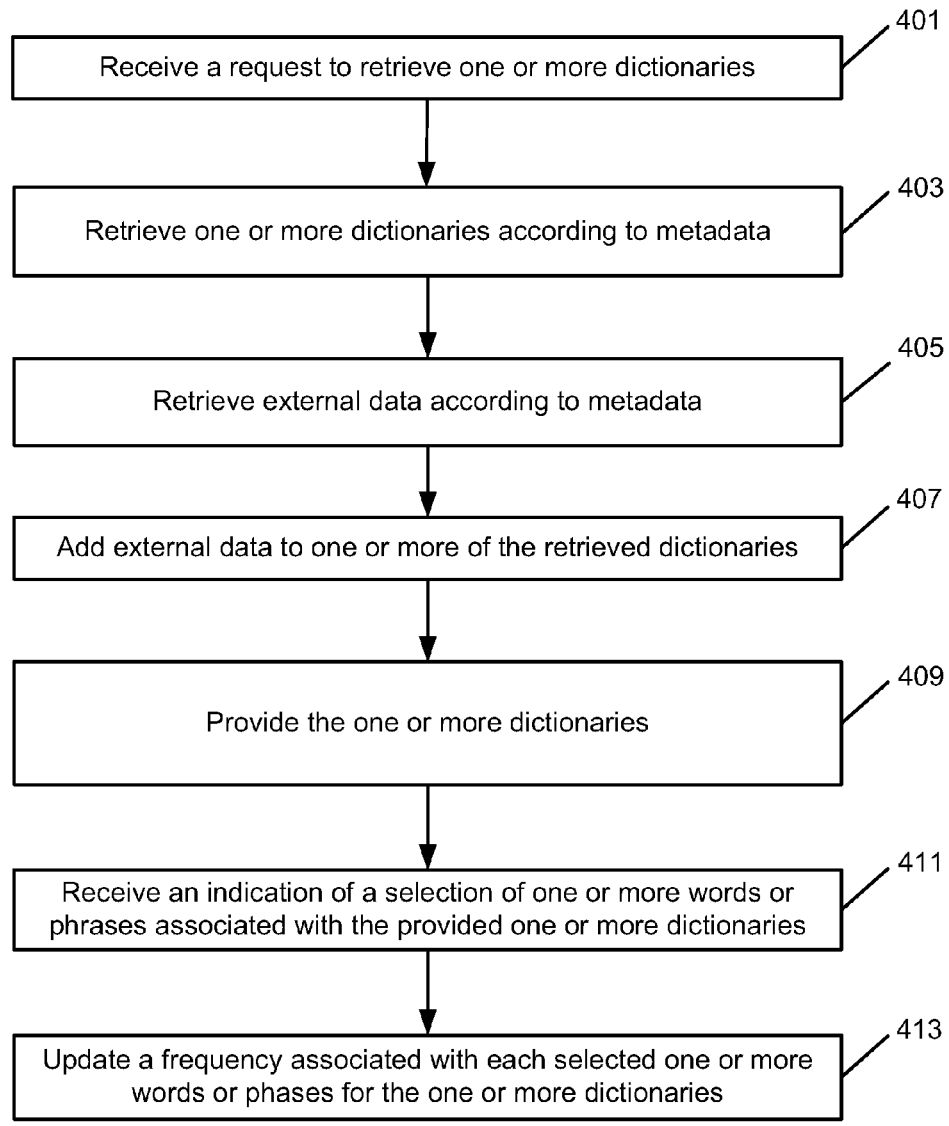
FIG. 4 is an operational flow of an implementation of a method for providing one or more dictionaries.

FIG. 4 is an operational flow of an implementation of a method 400 for providing one or more dictionaries. The method 400 may be implemented by the dictionary server 160, for example.

A request to retrieve one or more dictionaries is received at 401. The request may be received by the dictionary service 310 of the dictionary server 160 from a dictionary client 112. The request may include metadata. The metadata may specify the text generating application 113 that the one or more dictionaries may be used with. In implementations where the one or more dictionaries may be used to review a media content item, the metadata may include a proposed score for the review, a title or genre associated with the media content item, a location of a user associated with the review, and a language for the review, for example.

One or more dictionaries are retrieved according to the metadata associated with the request at 403. The one or more dictionaries may be retrieved from the dictionary data store 175 by the dictionary service 310. In some implementations, the dictionaries in the dictionary data store 175 may have associated metadata and the dictionary service 310 may retrieve the one or more dictionaries with metadata that matches some or all of the metadata associated with the request.

External data is retrieved according to the metadata associated with the request at 405. The external data may be retrieved by the external data engine 330 from one or more external data sources such as a search engine 140. For example, the external data engine 330 may use some or all of the metadata associated with the request as a query to the search engine 140. The set of results received from the search engine 140 may then be processed by the external data engine 330 to extract one or more words and phrases that are related to the request.

The external data is added to one or more of the retrieved dictionaries at 407. The external data may be added by the external data engine 330 to the retrieved one or more dictionaries.

The one or more dictionaries are provided at 409. The dictionaries may be provided by dictionary service 310 to the dictionary client 112. The dictionary client 112 may then display the words and phrases from the dictionaries in one or more user interface elements. A user of the client device 110 may then construct a sentence (or other text or phrases) by selecting a word or phrase from each of the user interface elements.

An indication of a selection of one or more words and phrases associated with a provided dictionary is received at 411. The indication of a selection may be received by the usage service 315 of the dictionary server 160. The indication of a selection may be an indication of the selection made by the user of the dictionary client 112 to one or more of the words and phrases displayed in the one or more user interface elements.

A frequency associated with each of the selected one or more words and phrases is updated at 413. The frequency may be updated by the usage service 315 or by one or more background processes and/or background processors. Each word or phrase in a dictionary may have an associated frequency in the usage data store 345 that dictates the probability and/or order with which the word or phrase is displayed in a user interface element by the dictionary client 112. The frequency may be adjusted by reducing the frequency by a predetermined amount, or according to a schedule or formula, for example.

Figure 5:
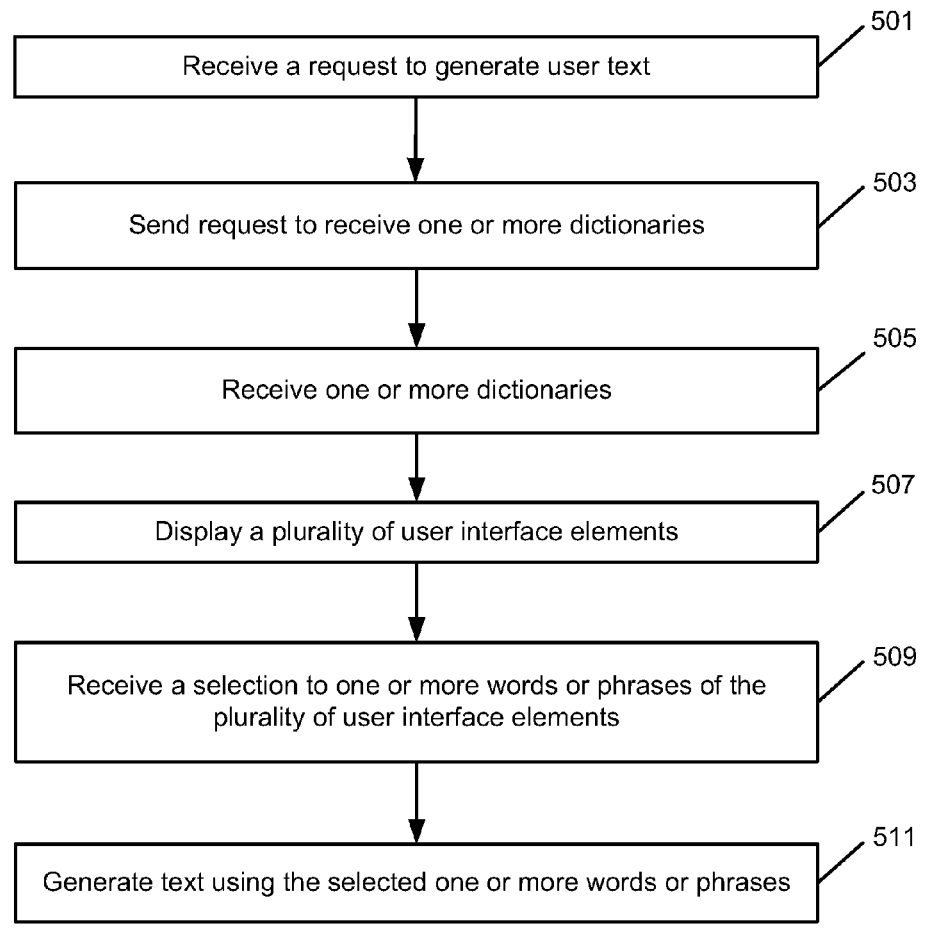
FIG. 5 is an operational flow of an implementation of a method for generating text using one or more dictionaries.

FIG. 5 is an operational flow of an implementation of a method 500 for generating text using one or more dictionaries. The method 500 may be implemented using the dictionary server 160 and the dictionary client 112.

A request to generate user text is received at 501. The request may be received by the dictionary client 112 from a text generating application 113. The text generating application may be a web browser, videogame console application, smart phone application, or other application, for example. Because the text generating application 113 may be executed by a text limited computing device, the dictionary client 112 may be used to assist the user in generating sentences, phrases, paragraphs, or other text. For example, a user of a video game console may be attempting to write a review of a favorite film. The user may have selected a rating for the review (e.g., thumbs up), and in response to the rating selection the text generating application 113 may invoke the dictionary client 112.

A request to receive one or more dictionaries is sent at 503. The request may be sent by the dictionary client 112 to the dictionary server 160. The request may include metadata. The metadata may include the type of text generating application 113 that is generating the text. Other data may also be included. Continuing the example described above, the metadata may include the proposed rating and the title or genre of the film being reviewed.

One or more dictionaries are received at 505. The dictionaries may be received by the dictionary client 112 from the dictionary server 160. The one or more dictionaries may have metadata that matches some or all of the metadata associated with the request. For example, the dictionaries may be dictionaries that were created for positive reviews of films in the specified genre of the film.

A plurality of user interface elements is displayed at 507. The user interface elements may be displayed by the dictionary client 112. Each of the user interface elements may correspond to a sentence component, and may display one or more words and phrases from the one or more dictionaries corresponding to the sentence components. Example user interface elements are illustrated further with respect to FIG. 2, for example. In some implementations, the dictionary client 112 may send a new request to receive a dictionary to the dictionary server 160, in response to, for example, an indication by the user that the currently displayed dictionary is not satisfactory and the user wishes to be presented with a different set of words and phrases. In such a case, responsive to the indication by the user received at the dictionary client 112, processing may continue at 503 or 401, for example.

A selection corresponding to one or more words and phrases of the plurality of user interface elements is received at 509. The selection may be received by the dictionary client 112. The selected words and phrases may form a complete sentence, phrase, or paragraph, for example. In an implementation, the user may cycle through the words or phrases displayed in each user interface element and construct a complete sentence from the words or phrases.

Text is generated using the selected one or more words and phrases at 511. The text may be generated by dictionary client 112 from the selected words and phrases. The generated text may be provided to the text generating client 113 by the dictionary client 112.

Figure 6:
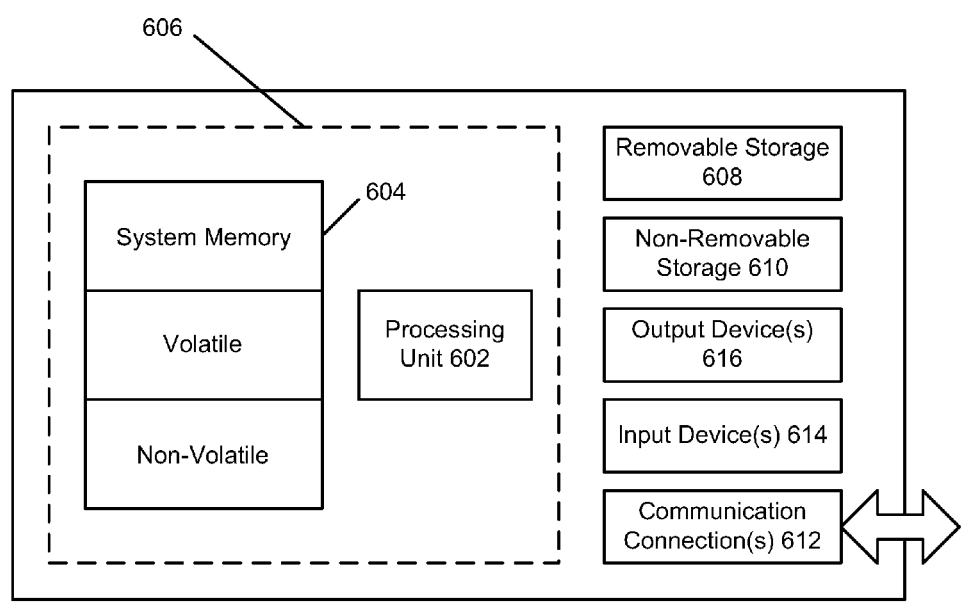
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices. Computing system 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a request to receive one or more dictionaries from a client device at a dictionary server, wherein the request includes metadata;
   retrieving one or more dictionaries, in response to the request, from a plurality of dictionaries by the dictionary server according to the included metadata, wherein each dictionary includes a plurality of words and phrases and each of the plurality of words and phrases have an associated frequency;
   providing the one or more dictionaries to the client device, for selection of a subset of the words and phrases from the one or more dictionaries, according to the associated frequencies;
   receiving an indication of a selection of a word or phrase of a provided dictionary;
   in response to receiving the selection, reducing the frequency associated with the selected word or phrase in the provided dictionary; and
   removing any words or phrases from the provided one or more dictionaries whose associated frequency falls below a threshold frequency.

2. The method of claim 1, wherein the request is associated with a request to review media content, and the metadata includes one or more of a title of the media content, a review score, or a genre of the media content.

3. The method of claim 2, wherein retrieving the one or more dictionaries in response to the request comprises determining if the one or more dictionaries are associated with the title of the media content, and if so retrieving the one or more dictionaries associated with the title of the media content.

4. The method of claim 3, further comprising, if no dictionaries are associated with the title of the media content, determining if any dictionaries are associated with a genre of the media content, and if so, retrieving the one or more dictionaries associated with the genre of the media content.

5. The method of claim 1, wherein the metadata includes a title, and further comprising:
   querying a search engine to determine one or more words and phrases associated with title; and
   adding the determined words and phrases associated with the title to the retrieved one or more dictionaries.

6. The method of claim 5, wherein the determined one or more phrases include names of characters associated with the title.

7. The method of claim 5, wherein the determined one or more phrases include names of actors associated with the title.

8. The method of claim 1, wherein the one or more dictionaries are retrieved, in response to the request, using a mechanism that is configurable by a user or an administrator.

9. A method comprising:
  receiving a request to generate text for a user by a client device, wherein the request includes metadata;
  sending a request to receive one or more dictionaries from the client device to a dictionary server, wherein the request includes the metadata;
  receiving one or more dictionaries from the dictionary server, wherein each dictionary includes a plurality of words and phrases and at least some of the words and phrases have associated frequencies;
  reducing one or more of the frequencies associated with at least some of the words and phrases of the one or more dictionaries according to a schedule;
  displaying a plurality of user interface elements by the client device, wherein each of the user interface elements corresponds to a component of a sentence and each of the user interface elements includes words and phrases from the one or more dictionaries corresponding to the component of the sentence;
  receiving a selection of a word or a phrase for each of the plurality of user interface elements; and
  generating text using the selected words and phrases, wherein the text comprises a complete sentence.

10. The method of claim 9, wherein the request to generate text includes one of a request to write a review of media content, a request to send a message, or a request to initiate a chat session.

11. The method of claim 10, wherein the metadata includes a score for the review, and a title associated with the media content.

12. The method of claim 10, wherein the media content includes videogame content, audio content, or music content.

13. The method of claim 9, wherein the metadata includes a title, and the one or more dictionaries include names of characters associated with the title.

14. The method of claim 9, wherein the metadata includes a title of a movie, and the one or more dictionaries include names of characters associated with the movie.

15. A system comprising:
  one or more computing devices;
  a dictionary server, implemented by the one or more computing devices, the dictionary server adapted to:
    receive a request to receive one or more dictionaries, wherein the request includes metadata;
    retrieve at least one dictionary in response to the request from a plurality of dictionaries according to the included metadata, wherein each dictionary includes a plurality of words and phrases and each of the plurality of words and phrases has an associated frequency;
    reduce one or more of the frequencies associated with each of the plurality of words and phrases of the at least one dictionary according to a schedule; and
    provide the at least one dictionary; and
  a client device, implemented by the one or more computing devices, the client device adapted to:
    generate the request to receive the at least one dictionary;
    receive the provided at least one dictionary;
    select a subset of the words and phrases from the at least one dictionary according to the associated frequencies;
    display a plurality of user interface elements, wherein each of the user interface elements includes a plurality of words and phrases from the selected subset; and
    for each user interface element, preselect one of the plurality of words and phrases based on the associated frequencies.

16. The system of claim 15, wherein the request is associated with a request to review media content, and the metadata includes at least one of a title of the media content, a review score, or a genre of the media content.

17. The system of claim 16, wherein the dictionary server adapted to retrieve the at least one dictionary comprises the dictionary server adapted to determine if the at least one dictionary is associated with the title of the media content, and if so retrieve the at least one dictionary associated with the title of the media content.

* * * * *